(12) United States Patent
Sarby et al.

(10) Patent No.: US 12,215,638 B2
(45) Date of Patent: Feb. 4, 2025

(54) VIBRATION REDUCTION IN INTERNAL COMBUSTION ENGINE

(71) Applicant: Scania CV AB, Södertälje (SE)

(72) Inventors: Håkan Sarby, Huddinge (SE); Andreas Dahl, Nyköping (SE); Ola Jönsson, Huddinge (SE); Fredrik Birgersson, Stockholm (SE); Marcus Ahlin, Strängnäs (SE)

(73) Assignee: Scania CV AB, Södertälje (SE)

( * ) Notice: Subject to any disclaimer, the term of this patent is extended or adjusted under 35 U.S.C. 154(b) by 0 days.

(21) Appl. No.: 18/002,518

(22) PCT Filed: Jun. 11, 2021

(86) PCT No.: PCT/SE2021/050561
§ 371 (c)(1),
(2) Date: Dec. 20, 2022

(87) PCT Pub. No.: WO2021/262065
PCT Pub. Date: Dec. 30, 2021

(65) Prior Publication Data
US 2023/0265802 A1    Aug. 24, 2023

(30) Foreign Application Priority Data
Jun. 24, 2020 (SE) .................. 2050750-5

(51) Int. Cl.
*F02D 13/02* (2006.01)
*F02B 1/14* (2006.01)
*F02B 75/02* (2006.01)

(52) U.S. Cl.
CPC ............ *F02D 13/0215* (2013.01); *F02B 1/14* (2013.01); *F02B 75/02* (2013.01);
(Continued)

(58) Field of Classification Search
CPC .......... F02B 1/12; F02B 1/14; F02D 13/0203; F02D 13/0215; F02D 13/0219;
(Continued)

(56) References Cited

U.S. PATENT DOCUMENTS 5,924,395 A     7/1999  Moriya et al.
5,967,940 A  *  10/1999  Yamaguchi .............. B60L 50/16
                                                                903/910

(Continued)

FOREIGN PATENT DOCUMENTS

EP       1063392 A2   12/2000
JP       S61185601 A   8/1986
(Continued)

OTHER PUBLICATIONS

Jun. 28, 2021—(WO) International Search Report & Written Opinion—App. No. PCT/SE2021/050561.
(Continued)

*Primary Examiner* — Erick R Solis
(74) *Attorney, Agent, or Firm* — Banner & Witcoff, Ltd.

(57) ABSTRACT

The disclosure concerns a method for vibration reduction in a compression ignition four-stroke internal combustion engine. The internal combustion engine comprises exhaust and intake valves controlled by exhaust and intake camshafts. The method comprises, when operating the internal combustion engine below a threshold rotational speed, steps of: changing a timing of the exhaust camshaft to advance closing of the exhaust valve, and —changing a timing of the intake camshaft to delay opening of the intake valve.

18 Claims, 4 Drawing Sheets

(52) U.S. Cl.
CPC .. *F02B 2075/027* (2013.01); *F02D 2200/101* (2013.01); *F02D 2250/28* (2013.01)

(58) Field of Classification Search
CPC ............. F02D 13/0261; F02D 13/0265; F02D 2200/101; F02D 2250/28
USPC ...... 123/90.11, 90.15–90.18, 192.1; 701/111
See application file for complete search history.

(56) References Cited

U.S. PATENT DOCUMENTS

| | | | |
|---|---|---|---|
| 8,714,123 | B2 | 5/2014 | Rollinger et al. |
| 2001/0050067 | A1 | 12/2001 | Sato |
| 2002/0195078 | A1 | 12/2002 | Hasegawa et al. |
| 2006/0081207 | A1 | 4/2006 | Nakamura |
| 2006/0102127 | A1 | 5/2006 | Izumi et al. |
| 2008/0097685 | A1 | 4/2008 | Nakamura |
| 2008/0230022 | A1 | 9/2008 | McKay et al. |
| 2010/0139591 | A1 | 6/2010 | Nakamura |
| 2010/0170460 | A1 | 7/2010 | Leone et al. |
| 2010/0300386 | A1 | 12/2010 | Asami et al. |
| 2011/0231077 | A1 | 9/2011 | Nakamura |
| 2013/0080026 | A1 | 3/2013 | Kang et al. |
| 2013/0087110 | A1 | 4/2013 | Kang et al. |
| 2014/0060470 | A1 | 3/2014 | Kobayashi et al. |
| 2019/0145306 | A1* | 5/2019 | Tanaka ................ F02D 41/0065 123/299 |
| 2019/0145337 | A1* | 5/2019 | Tanaka ..................... F02B 1/10 123/294 |
| 2021/0148301 | A1* | 5/2021 | Schlingmann ........ F02D 41/345 |
| 2021/0396186 | A1* | 12/2021 | Höckerdal .......... F02D 13/0207 |

FOREIGN PATENT DOCUMENTS

| | | |
|---|---|---|
| JP | H02259232 A | 10/1990 |
| JP | H1130135 A | 2/1999 |
| JP | 2004162617 A | 6/2004 |
| JP | 2004332662 A | 11/2004 |
| JP | 2010084645 A | 4/2010 |
| JP | 2011157880 A | 8/2011 |
| JP | 2016121633 A | 7/2016 |
| WO | 2017217908 A1 | 12/2017 |

OTHER PUBLICATIONS

Feb. 11, 2021—(SE) Office Action—App. No. 2050750-5.
Jul. 1, 2021—(SE) Office Action—App. No. 2050750-5.
Nov. 19, 2019—(SE) Technology Search Report—App. No. 2050750-5.
May 15, 2024—(EP) Supp ESR & Opinion—App. No. EP 21827936.

* cited by examiner

VIBRATION REDUCTION IN INTERNAL COMBUSTION ENGINE

CROSS-REFERENCE TO RELATED APPLICATIONS

The present application claims priority from and is a U.S. National Phase of International Application No. PCT/SE2021/050561, which was filed on Jun. 11, 2021, designating the United States of America and claiming priority to Swedish Patent Application No. 2050750-5, filed on Jun. 24, 2020. This application claims priority to and the benefit of the above-identified applications, which are all fully incorporated by reference herein in their entireties.

TECHNICAL FIELD

The invention relates to a method for vibration reduction in a compression ignition four-stroke internal combustion engine, to a control arrangement for controlling a variable valve timing of a compression ignition four-stroke internal combustion engine, to a compression ignition four-stroke internal combustion engine, and to a vehicle. The invention further relates to a computer program and to a computer-readable storage medium.

BACKGROUND

A compression ignition four stroke internal combustion engine, ICE, may vibrate excessively when operating at low rotational speeds. Over time, such vibrations may harm the ICE. Such vibrations may cause discomfort to a driver and/or passengers of a vehicle propelled by the ICE. In a fixed installation, such vibrations may cause structural resonances.

More specifically, in a diesel compression ignition ICE, the compression ratio is within a range of 14:1-26:1, which is high compared to the compression ratio in a spark ignition ICE. The high compression ratio and the resulting high pressure combustion of fuel in the cylinders of the ICE in conjunction with the ICE operating at a low rotational speed, causes the ICE to vibrate excessively. Namely, at low rotational speeds of the ICE, the combustions in the individual cylinders occur separated in time to such an extent that they may be seen as singular events, which in turn cause the ICE to vibrate excessively. The lower the number of cylinders of the ICE, the greater the vibration problem. At higher rotational speeds of the ICE on the other hand, the combustions in the individual cylinders occur more frequently thus, the vibrations from the individual cylinders cancel each other to a greater extent and the engine vibrations are reduced.

In the context of start-up of spark ignition internal combustion engines, US 2010/139591, US 2013/080026, and US 2014/060470 discuss the use of variable valve timing of one valve.

SUMMARY

It would be advantageous to achieve a compression ignition internal combustion engine overcoming, or at least alleviating, at least some of the above mentioned drawbacks. In particular, it would be desirable to reduce vibrations in a compression ignition internal combustion engine. To better address one or more of these concerns, one or more of a method, a control arrangement, a compression ignition four stroke internal combustion engine, and a vehicle having the features defined in one or more of the independent claims is provided.

According to an aspect of the invention, there is provided a method for vibration reduction in a compression ignition four-stroke internal combustion engine, the internal combustion engine comprising: an exhaust valve and an intake valve, an exhaust camshaft arranged to control the opening and closing of the exhaust valve, and an intake camshaft arranged to control the opening and closing of the intake valve. The method comprises, when operating the ICE below a threshold rotational speed, steps of:
changing a timing of the exhaust camshaft to advance closing of the exhaust valve, and
changing a timing of the intake camshaft to delay opening of the intake valve.

According to a further aspect of the invention, there is provided a control arrangement for controlling a variable valve timing of a compression ignition four-stroke internal combustion engine. The internal combustion engine comprises: an exhaust valve and an intake valve, an exhaust camshaft arranged to control the opening and closing of the exhaust valve, and an intake camshaft arranged to control the opening and closing of the intake valve. The control arrangement is configured to, when operating the ICE below a threshold rotational speed:
change a timing of the exhaust camshaft to advance closing of the exhaust valve, and
change a timing of the intake camshaft to delay opening of the intake valve.

Since, when operating the internal combustion engine, ICE, below a threshold rotational speed, changing a timing of the exhaust camshaft to advance closing of the exhaust valve and changing a timing of the intake camshaft to delay opening of the intake valve is performed, engine vibrations are reduced when the ICE is operated at a rotational speed below the threshold rotational speed.

More specifically, due to the above mentioned timing changes of the exhaust and intake camshafts, the compression ratio within the cylinders of the ICE is reduced providing lower combustion pressure compared to when no timing changes of the camshafts are performed. Also, a pressure difference between Top Dead Centre fire, TDCf, and Top Dead Centre gas exchange, TDCge, of a piston of the ICE is reduced. The low pressure combustion and the reduced pressure difference reduces the energy of the vibrations. An increase in the pressure at TDCge is achieved, which reduces vibration energy at the fundamental vibration frequency and increases the vibration energy at double the fundamental frequency. Vibrations at double the fundamental frequency are more easily isolated the vibration at the fundamental frequency.

Thus, the vibrations will be less harmful, and/or cause less discomfort to a driver and/or passengers, and/or reduce structural resonances than when no timing changes of the camshafts are performed.

According to a further aspect of the invention, there is provided a compression ignition four-stroke internal combustion engine comprising a control arrangement according to any one of aspects and/or embodiments discussed herein.

The compression ignition four-stroke internal combustion engine may be a diesel compression ignition ICE. Herein, the compression ignition four-stroke ICE alternatively, may be simply referred to as internal combustion engine, ICE, or engine.

The ICE comprises a crankshaft, an exhaust camshaft, an intake camshaft, and the control arrangement. A rotational speed of the crankshaft may herein alternatively be referred to as a rotational speed of the ICE. Further, the ICE may comprise at least one cylinder arrangement. The cylinder arrangement may comprise the exhaust and intake valves controlled by the exhaust and intake camshafts, respectively, a combustion chamber, a cylinder bore, and a piston configured to reciprocate in the cylinder bore and being connected to the crankshaft. The cylinder arrangement may comprise further exhaust and/or intake valves.

As in any four-stroke ICE, during two revolutions of the crankshaft, the piston performs an intake stroke, a compression stroke, an expansion stroke also referred to as power or combustion stroke, and an exhaust stroke in the cylinder bore of the cylinder arrangement. The ICE may comprise more than one cylinder arrangement, such as e.g. three, four, five, six, or eight cylinder arrangements.

In a diesel compression ignition ICE, combustion in each cylinder arrangement during a power stroke of the relevant piston starts at one point and spreads as a flame front within the combustion chamber. This is referred to as diffusion combustion and includes simultaneous mixing of air with fuel in the combustion chamber while combustion takes place. Put differently, the compression ignition ICE is configured for diffusion combustion during a power stroke of the piston of the cylinder arrangement. It may be noted that there are other forms of combustion such as e.g. HCCI, Homogeneous-Charge Compression Ignition, combustion, wherein mixing of air with fuel in the combustion chamber takes place before combustion starts.

The compression ratio of the ICE may be within a range of 14:1-26:1.

The exhaust camshaft is configured to control the opening and closing of the exhaust valve in a commonly known manner with an ordinary cam lobe of the exhaust camshaft controlling the exhaust valve. The intake camshaft is configured to control the opening and closing of the intake valve in a commonly known manner with a cam lobe of the intake camshaft controlling the intake valve.

The rotations of the exhaust and intake camshafts are synchronized with the crankshaft. However, the timing of the exhaust and intake camshafts is changeable, i.e. the rotational positions of the camshafts in relation to the crankshaft are controllable.

In practice, this means that the crankshaft angle at which a valve controlled by the relevant camshaft is opened and closed can be changed. The changing of the timing of the camshafts may be performed in any known manner. For instance, WO 2017/217908 and U.S. Pat. No. 8,714,123 disclose timing control arrangements to be utilised for changing the timing of the camshafts.

It is to be noted that an angular length of the open period of each of the exhaust and intake valves may remain the same when the timings of the camshafts are changed. This, as opposed to systems wherein e.g. lost motion mechanisms are utilised for changing closing and/or opening positions of valves, which accordingly will also affect the angular length of the period during which the relevant valve remains open.

As mentioned above, the timings of the exhaust and intake camshafts are controllable by the control arrangement, i.e. the control arrangement is configured to change the rotational position of the camshafts in relation to the crankshaft. Herein reference is made to variable valve timing and timing change. This may alternatively be referred to as phase shifting or cam phasing.

A timing change angle of the respective camshaft is the angle by which the timing of the camshaft is changed in relation to its ordinary angular operating position in relation to the crankshaft.

If the cylinder arrangement comprises one or more additional intake valves and/or exhaust valves, also these valves may be subjected to variable valve timing in the manner discussed above. This will occur if such additional valves are controlled by the first and/or second camshafts. Accordingly, if the additional valves are controlled by additional camshafts, also the timing of any additional camshafts may be changed as discussed herein.

It should be noted that performing timing changes of the exhaust and intake camshafts as discussed above will reduce the amount of air and the pressure within a relevant cylinder around its Top Dead Centre fire, TDCfire, both by permitting the exhaust gas to escape early during the power stroke and by reducing the amount of air being compressed during the compression stroke.

Moreover, due to the timing changes of the exhaust and intake camshafts as discussed above, there will be no overlap between the exhaust valve and the intake valve at Top Dead Centre gas exchange, TDCge, i.e. the exhaust valve will close before the piston reaches its TDCge and the intake valve will open after the piston has reached its TDCge. Accordingly, an amount of gas will remain trapped within the cylinder in the transition between the exhaust and intake strokes. The trapped amount of gas will be compressed in the cylinder, thus, causing the pressure within the cylinder to increase during the exhaust stroke. Furthermore, a pressure build-up in the combustion chamber is performed each time the piston travels upwardly in the cylinder bore, i.e. during the compression and exhaust strokes, as opposed to when there are no timing changes of the camshafts and pressure is only built-up during the compression stroke. Thus, the frequency of the pressure build-ups is increased which in turn changes the characteristics of the vibrations and how they are perceived.

According to embodiments, an absolute value of a timing change angle of the exhaust camshaft during the steps of changing the timing of the exhaust camshaft and an absolute value of a timing change angle of the intake camshaft during the step of changing the timing of the intake camshaft may be the same. In this manner, there may be provided symmetrical timing changes about, TDCge. Such symmetrical timing changes may further ensure both permitting the exhaust gas to escape early during the power stroke and reducing the amount of air being compressed during the compression stroke around Top Dead Centre fire, TDCfire. In comparison with asymmetric timing changes, a more symmetric pressure around both TDCge and TDCf within the combustion chamber is achieved. Also, symmetrical timing changes are beneficial from a fuel consumption perspective.

According to embodiments, preceding the steps of changing the timing of the exhaust camshaft and changing the timing of the intake camshaft, the method may comprise a step of:

sensing vibrations of the internal combustion engine, and
wherein in response to sensed vibrations exceeding a threshold level, the steps of changing the timing of the exhaust camshaft and changing the timing of the intake camshaft are performed. In this manner, the timing changes of the exhaust and intake camshafts may be performed when there is an actual requirement for reducing vibrations of the ICE. More specifically, in addition to operating the ICE below a threshold rotational speed, sensing vibrations of the ICE above a threshold level may initiate the timing changes of the exhaust and intake camshafts thus, reducing the vibrations of the ICE.

The terms sensing is to be broadly interpreted and encompasses both direct and indirect sensing of vibrations. Vibrations may be directly sensed by means of e.g. one or more accelerometers. Vibrations may be indirectly sensed, e.g. by means of a rotational speed sensor of the ICE and rotational speed irregularities or a mapping of vibration critical rotational speed irregularities. The term sensing vibrations may also encompasses measuring of vibrations.

According to embodiments, the method may be performed in a vehicle configured for land-based propulsion. In this manner, a driver and/or passengers of the vehicle may travel comfortably in the vehicle due to the reduced level of vibrations provided by the method.

According to embodiments, preceding the steps of changing the timing of the exhaust camshaft and changing the timing of the intake camshaft, the method may comprise a step of:
  determining whether the vehicle is propelled at a speed below a threshold speed, and wherein
  in response to the vehicle being propelled at a speed below the threshold speed the steps of changing the timing of the exhaust camshaft and changing the timing of the intake camshaft are performed. In this manner, the timing changes of the exhaust and intake camshafts may be performed when there might be a likelihood that the ICE would vibrate excessively. More specifically, in addition to operating the ICE below a threshold rotational speed, determining whether the vehicle is propelled at a speed below a threshold speed may initiate the timing changes of the exhaust and intake camshafts thus, reducing the vibrations of the ICE.

According to embodiments, the vehicle may comprise a positioning system, such as a GPS system, and wherein preceding the steps of changing the timing of the exhaust camshaft and changing the timing of the intake camshaft, the method may comprise a step of:
  determining a position of the vehicle, and wherein
  in response to the position of the vehicle being determined to be within an area of a particularly defined type the steps of changing the timing of the exhaust camshaft and changing the timing of the intake camshaft are performed. In this manner, the timing changes of the exhaust and intake camshafts may be performed when the vehicle is within an area where noise reduction may be preferred or required. More specifically, in addition to operating the ICE below a threshold rotational speed, determining whether the vehicle is within an area of a particularly defined type, such as near a hospital, near a retirement home, or within city limits, may initiate the timing changes of the exhaust and intake camshafts thus, reducing the vibrations of the ICE and accordingly, reducing the noise level of the vehicle.

According to a further aspect of the invention, there is provided a vehicle comprising a compression ignition four-stroke internal combustion engine according to any one of aspects and/or embodiments discussed herein.

The ICE may form part of a powertrain of the vehicle.

According to a further aspect of the invention, there is provided a computer program comprising instructions which, when the program is executed by a computer, cause the computer to carry out the steps of the method according to any one of aspects and/or embodiments discussed herein.

According to a further aspect of the invention, there is provided a computer-readable storage medium comprising instructions which, when executed by a computer, cause the computer to carry out the steps of the method according to any one of aspects and/or embodiments discussed herein.

Further features of, and advantages with, the invention will become apparent when studying the appended claims and the following detailed description.

BRIEF DESCRIPTION OF THE DRAWINGS

Various aspects and/or embodiments of the invention, including its particular features and advantages, will be readily understood from the example embodiments discussed in the following detailed description and the accompanying drawings, in which.

DETAILED DESCRIPTION

Aspects and/or embodiments of the invention will now be described more fully. Like numbers refer to like elements throughout. Well-known functions or constructions will not necessarily be described in detail for brevity and/or clarity.

Figure 1:
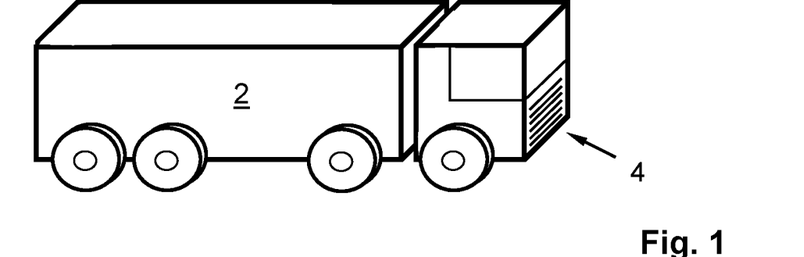
FIG. 1 illustrates embodiments of a vehicle,
  FIG. 2 schematically illustrates embodiments of an internal combustion engine.

FIG. 1 illustrates embodiments of a vehicle 2 configured for land-based propulsion. The vehicle 2 comprises a compression ignition four-stroke internal combustion engine, ICE, 4 according to aspects and/or embodiments discussed herein, such as e.g. the ICE discussed below with reference to FIG. 2. The ICE 4 comprises a control arrangement, as discussed below with reference to FIGS. 2 and 3.

In these embodiments, the vehicle 2 is a heavy load vehicle in the form of a truck. Although the invention is not limited to any particular type of vehicle, the invention is particularly relevant for vehicles for land-based propulsion comprising larger compression ignition ICEs, such as also e.g. busses or construction vehicles.

Figure 2:
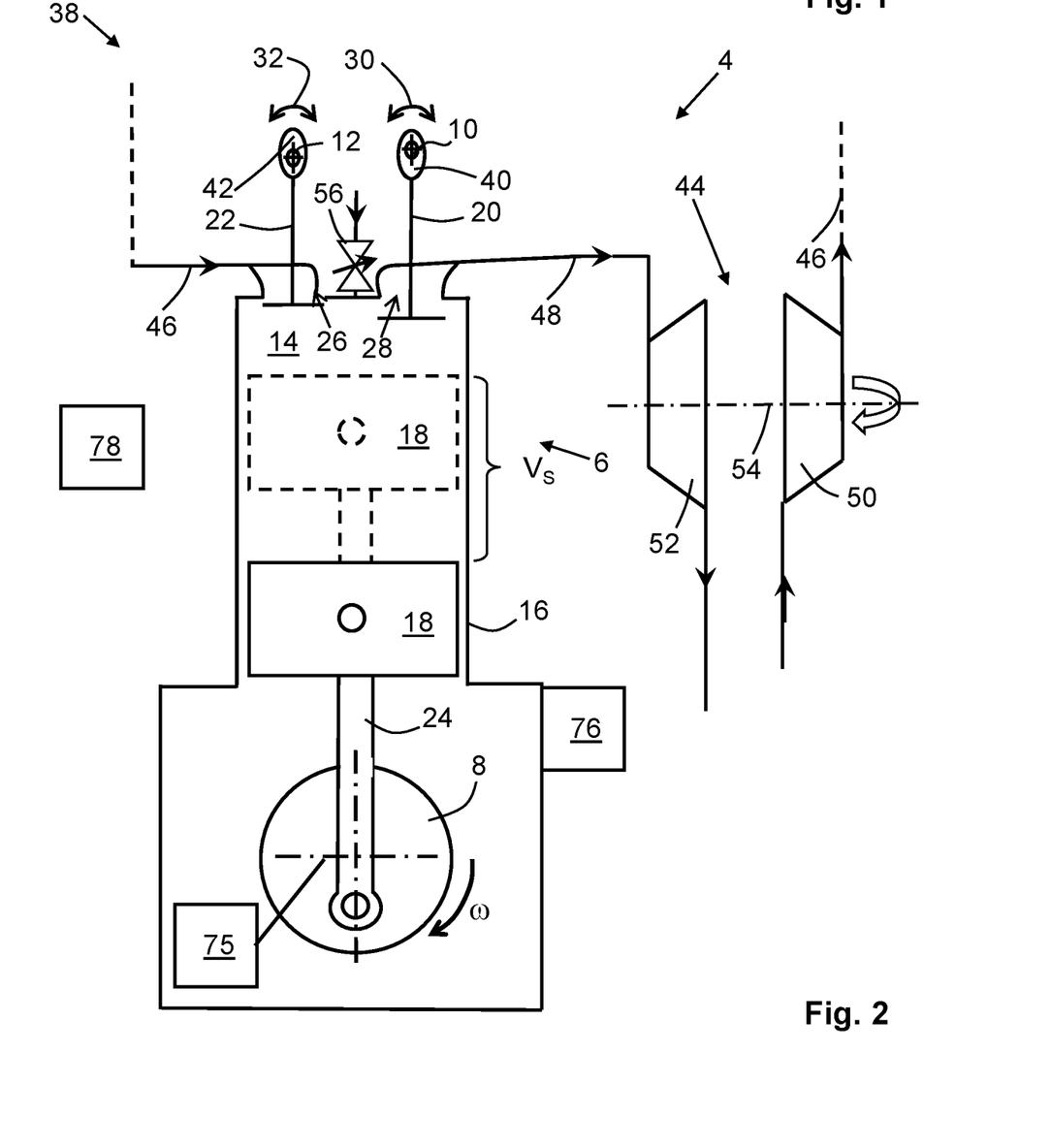

FIG. 2 schematically illustrates embodiments of an ICE 4. The ICE 4 may be configured to form part of a powertrain of a vehicle, such as e.g. the vehicle 2 shown in FIG. 1.

The ICE 4 is a compression ignition four-stroke direct injection internal combustion engine, e.g. a diesel engine. The ICE 4 comprises at least one cylinder arrangement 6, a crankshaft 8, an exhaust camshaft 10, an intake camshaft 12.

The cylinder arrangement 6 comprises a combustion chamber 14, a cylinder bore 16, a piston 18 configured to reciprocate in the cylinder bore 16, an exhaust valve 20, and an intake valve 22. The piston 18 is connected to the crankshaft 8 via a connecting rod 24.

The movement of the exhaust valve 20 is controlled by the exhaust camshaft 10, i.e. the exhaust camshaft 10 is configured to control the opening and closing of the exhaust valve 20. The movement of the intake valve 22 is controlled by the intake camshaft 12, i.e. the intake camshaft 12 is configured to control the opening and closing of the intake valve 22.

The intake valve 22 is configured for admitting charge air into the combustion chamber 14, and the exhaust valve 20 is configured for letting exhaust gas out of the combustion chamber 14. The timing of the exhaust camshaft 10 is configured to the be controlled by a timing control arrangement 30 as indicated by a double arrow. Similarly, the timing of the intake camshaft 12 is configured to the be controlled by a timing control arrangement 32 as indicated by a double arrow.

In a known manner, the intake valve 22 comprises an intake valve head configured to seal against an intake valve seat extending around an intake opening 26. Similarly, the exhaust valve 20 comprises an exhaust valve head configured to seal against an exhaust valve seat extending around an exhaust opening 28.

In a known manner, the camshafts 10, 12 may rotate at half the rotational speed of the crankshaft 8 and control the movement of the exhaust and intake valves 20, 22 via cam lobes 40, 42 arranged on the camshafts 10, 12. The exhaust camshaft 10 is arranged for controlling movement of the exhaust valve 20, and opening and closing of the exhaust opening 28. The exhaust camshaft 10 comprises a cam lobe 40. For instance, by abutting against the cam lobe 40, the exhaust valve 20 will follow a contour of the cam lobe 40. The exhaust valve 20 may be biased towards its closed position, e.g. by means of a non-shown spring. The movement of the intake valve 22 is controlled in a corresponding manner by the intake camshaft 12 and its cam lobe 42 for opening and closing the intake opening 26.

The piston 18 is arranged to reciprocate in the cylinder bore 16. The piston 18 performs four strokes in the cylinder bore 16, corresponding to an intake stroke, a compression stroke, an expansion or power stroke, and an exhaust stroke, see also FIG. 4. In FIG. 2 the piston 18 is illustrated with continuous lines at its Bottom Dead Centre, BDC, and with dashed lines at its Top Dead Centre, TDC. The combustion chamber 14 is formed above the piston 18 inside the cylinder bore 16.

The cylinder arrangement 6 has a total swept volume, Vs, in the cylinder bore 16 between the BDC and the TDC. According to some embodiments, the cylinder arrangement 6 may have a total swept volume, $V_s$, of within a range of 0.25 to 4 litres or within a range of 1 to 4 litres.

The ICE 4 may comprise more than one cylinder arrangement 6, such as e.g. three, four, five, six, or eight cylinder arrangements 6. Mentioned purely as an example, the total swept volume of the ICE 4, i.e. the sum of the swept volumes Vs of the cylinder arrangements of the ICE 4, may be within a range of 1-20 litres, or within a range of 5-20 litres.

The ICE 4 comprises a turbocharger 44. The turbocharger 44 comprises a compressor 50 and a turbine 52. The compressor 50 and the turbine 52 of the turbocharger 44 are connected via a common shaft 54. An inlet conduit 46 for charge air, leads from the compressor 50 to the intake opening 26. For the sake of clarity, the inlet conduit 46 is not shown in its entirety. An exhaust conduit 48 leads from the exhaust opening 28 to the turbine 52. The turbocharger 44 produces a charge air pressure in the inlet conduit 46 and at the intake valve 22. More specifically, the gas discharged via the exhaust valve 20 drives the turbine 52, which in turn rotates the compressor 50. Thus, the compressor 50 provides charge air a to the intake valve 22.

The ICE 4 comprises a fuel injector 56 configured for injecting fuel into the combustion chamber 14 when the ICE 4 produces positive torque during power strokes of the piston 18, e.g. for propelling the vehicle 2.

The ICE 4 further comprises a control arrangement 38 according to aspects and/or embodiments discussed herein.

The control arrangement 38 is configured for controlling variable valve timing of the ICE 4. That is, the control arrangement 38 is configured for controlling at least the timing of the exhaust camshaft 10 and the timing of the intake camshaft 12. Accordingly, the timing control arrangements 30, 32 form part of the control arrangement 38.

In order to reduce vibrations of the ICE 4, the control arrangement 38 is configured to, when operating the ICE 4 below a threshold rotational speed:
  change a timing of the exhaust camshaft 10 to advance closing of the exhaust valve 20, and
  change a timing of the intake camshaft 12 to delay opening of the intake valve 22.

In addition to the threshold rotational speed, further conditions may apply for the timing changes of the camshafts 10, 12 to be performed. Such further conditions may relate to ICE vibration level, vehicle speed, and/or vehicle position, as discussed herein.

According to embodiments, the threshold rotational speed may be a rotational speed $\omega$ within a range of 1-1000 rpm. In this manner, the threshold rotational speed of the engine 4 may be delimited at a rotational speed, below which excessive engine vibrations occur.

The threshold rotational speed of the ICE 4 may be different for different conditions. For instance, if the rotational speed of the ICE 4 is the sole condition for performing the timing changes of the crankshafts 10, 12, a first threshold rotational speed may apply. If the condition includes the rotational speed of the ICE 4 and a further condition such as e.g. the vehicle speed, a second threshold rotational speed, different from the first threshold rotational speed, may apply.

The particular threshold speed may depend on the particular ICE, its size, number of cylinders etc. and the suspension of the ICE in the vehicle or other structure. The suspension of a cabin of the vehicle may affect which vibrations could be transferred to the driver and/or passengers of the vehicle and thus, may also influence the choice of threshold speed or speeds.

The control arrangement 38 comprises a rotational speed sensor 75 for sensing the rotational speed of the crankshaft 8 of the ICE 4.

The control arrangement 38 and the timing changes of the camshafts 10, 12 are further discussed below with reference to FIGS. 3-6.

Figure 3:
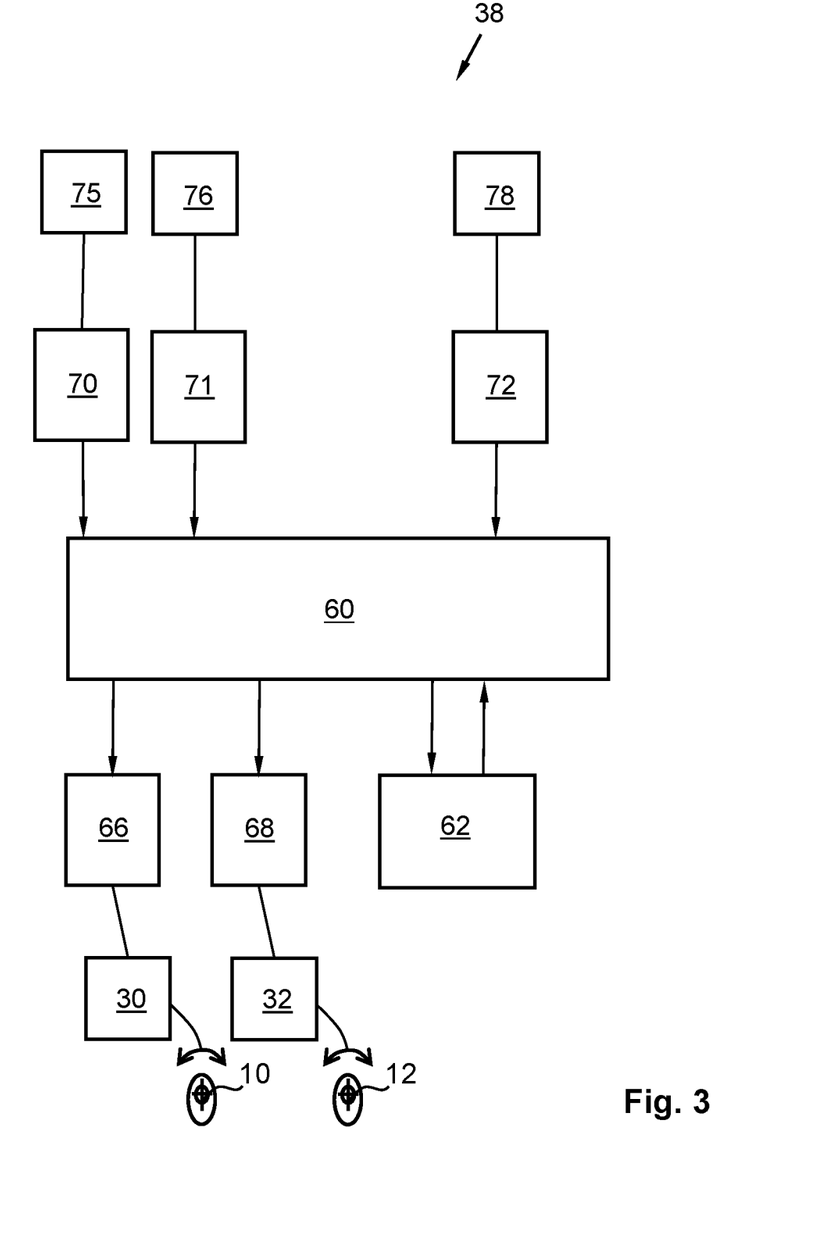
FIG. 3 illustrates a control arrangement.

FIG. 3 illustrates a control arrangement 38 to be utilised in connection with various aspects and/or embodiments of the invention. In particular, the control arrangement 38 is configured for the control of the timing of the camshafts 10, 12 of the ICE 4 discussed in connection with FIGS. 1 and 2. The control arrangement 38 is also indicated in FIG. 2. The control arrangement 38 and engine 4 may be provided in a vehicle 2. Accordingly, in the following reference is made to FIGS. 1-3.

The control arrangement 38 comprises at least one calculation unit 60, which may take the form of substantially any suitable type of processor circuit or microcomputer, e.g. a circuit for digital signal processing (digital signal processor, DSP), a Central Processing Unit (CPU), a processing unit, a processing circuit, a processor, an Application Specific Integrated Circuit (ASIC), a microprocessor, or other processing logic that may interpret and execute instructions. The herein utilised expression "calculation unit" may represent a processing circuitry comprising a plurality of processing circuits, such as, e.g., any, some or all of the ones mentioned above. The calculation unit 60 may be configured to perform calculations, such as e.g. analysing accelerometer data and/or rotational speed sensor measurements as discussed herein. The calculation unit 60 may be configured to compare GPS data with map data. The calculation unit 60 may be configured to compare measured or calculated data with threshold values.

The control arrangement 38 comprises a memory unit 62. The calculation unit 60 is connected to the memory unit 62, which provides the calculation unit 60 with, e.g. stored programme code, data tables, and/or other stored data which the calculation unit 60 needs to enable it to do calculations and to control the ICE. The calculation unit 60 is also adapted to store partial and/or final results of calculations in the memory unit 62. The memory unit 62 may comprise a physical device utilised to store data or programs, i.e. sequences of instructions on a temporary or permanent basis. According to some embodiments, the memory unit 62 may comprise integrated circuits comprising silicon-based transistors. The memory unit 62 may comprise e.g. a memory card, a flash memory, a USB memory, a hard disc, or another similar volatile or non-volatile storage unit for storing data such as e.g. ROM (Read-Only Memory), PROM (Programmable Read-Only Memory), EPROM (Erasable PROM), EEPROM (Electrically Erasable PROM), etc. in different embodiments.

The control arrangement 38 is further provided with respective devices 70, 71, 72, 66, 68 for receiving and/or sending input and output signals. These input and output signals may comprise waveforms, pulses or other attributes, which can be detect as information by signal receiving devices, and which can be converted to signals processable by the calculation unit 60. Input signals are supplied to the calculation unit 60 from the input receiving devices 70, 71, 72. Output signal sending devices 66, 68 are arranged to convert calculation results from the calculation unit 60 to output signals for conveying to signal receiving devices of other parts of the control arrangement 38. Each of the connections to the respective devices for receiving and sending input and output signals may take the form of one or more from among a cable, a data bus, e.g. a CAN (controller area network) bus, a MOST (media orientated systems transport) bus or some other bus configuration, or a wireless connection. In the embodiment depicted, only one calculation unit 60 and memory unit 62 are shown, but the control arrangement 38 may alternatively comprise more than one calculation unit and/or memory unit.

Mentioned as examples, the output signal sending devices 66, 68, may send control signals to the timing control arrangements 30, 32 of the exhaust and intake camshafts 10, 12. The input signal receiving devices 70, 71, 72 may receive signals from the ICE 4, such as e.g. from a rotational speed sensor 75 of the crankshaft 8 of the ICE 4, a vibration sensor 76, and a vehicle position sensor 78.

Examples of data tables may be e.g.;
a table containing accelerometer measurement and engine vibration level concordance,
a table containing timing change angles of the exhaust and intake camshafts 10, 12 at specific engine rotational speeds of the ICE 4,
a table containing ICE rotational speed irregularities and their concordance with vibrations,
a table containing timing change angles of the exhaust and intake camshafts 10, 12 at different vibration levels,
tables containing map data e.g. related to city areas and/or noise restriction areas,
Examples of data may be measured, monitored, determined, and/or calculated data, such as rotational speed data, engine vibration data, timing change angle data. The control arrangement 38 comprises or is connected to various sensors and actuators in order to receive input and provide output for performing the various aspects and embodiments of the method discussed herein. Some of the various sensors are exemplified above. An example of actuators may be actuators configured for changing the timing of the camshafts 10, 12 and forming part of the timing control arrangements 30, 32.

The control arrangement 38 may be configured to perform a method 100 according to any one of aspects and/or embodiments discussed herein, see e.g. below with reference to FIG. 5.

As mentioned above, when operating the ICE 4 below a threshold rotational speed, the control arrangement 38 is configured to:
change a timing of the exhaust camshaft 10 to advance closing of the exhaust valve 20, and
change a timing of the intake camshaft 12 to delay opening of the intake valve 22.

Herein, reference is made to crankshaft angle degrees, CA degrees, e.g. when discussing timing changes of the camshafts. One full rotation of the crankshaft is 360 CA degrees. Crankshaft angle may be measured e.g. from Top Dead Centre fire, TDCfire, or Top Dead Centre gas exchange, TDCge. Negative timing change angles related to advancing the opening and closing of a relevant valve and positive timing change angles related to delaying the opening and closing of a relevant valve.

An overlap between the exhaust and intake valves means that the exhaust and intake valves are open simultaneously at TDCge. A negative overlap between the exhaust and intake valves means that the exhaust and intake valves are not open simultaneously at TDCge. According to embodiments, the control arrangement 38 may comprise a sensor 75, 76 configured to sense vibrations of the ICE 4. The control arrangement 38 may be configured to, when operating the internal combustion engine (4) below the threshold rotational speed and in response to sensed vibrations exceeding a threshold level: change the timing of the exhaust camshaft 10 to advance closing of the exhaust valve 20, and change the timing of the intake camshaft 12 to delay opening of the intake valve 22. In this manner, in addition to the rotational speed of the ICE 4, the information provided by the sensor 75, 76 configured to sense vibrations of the ICE 4 may be utilised for reducing vibrations of the engine 4 with the timing changes of the exhaust and intake camshafts 10, 12.

The sensor configured to sense vibrations of the ICE 4 may for instance be an accelerometer 76 mounted on the engine 4 or close to the engine 4 in a manner such that the accelerometer 76 is affected by engine vibrations. The calculation unit 60 may be configured to evaluate the signal from the accelerometer 76 in order to establish a magnitude of the engine vibrations. According to an alternative embodiment, the sensor configured to sense vibrations of the engine 4 may comprise the rotational speed sensor 75 of the engine 4. The rotational speed sensor 75 forms part of an ordinarily control system of the ICE 4. Such a rotational speed sensor 75 may for instance be a Hall effect sensor which is arranged to provide a large number of pulses during one rotation of the crankshaft 8. Based on the pulses, the calculation unit 60 may determine rotational speed irregularities/variations of the rotational speed ω of the crankshaft 8. Certain rotational speed irregularities/variations may be identified as engine vibrations, or may cause engine vibrations, above the threshold level.

According to embodiments wherein the control arrangement 38 is arranged in a vehicle 2, the control arrangement 38 may be configured to determine whether the vehicle 2 is propelled at a speed below a threshold speed. When operating the internal combustion engine 4 below the threshold rotational speed and in response to the vehicle 2 being propelled at a speed below the threshold speed, the control arrangement 38 may be configured to change the timing of the exhaust camshaft 10 to advance closing of the exhaust valve 20, and change the timing of the intake camshaft 12 to delay opening of the intake valve 22. In this manner, not only the rotational speed of the engine 4 but also the vehicle speed may determine whether the timings of the exhaust and intake camshafts 10, 12 are changed. Namely, certain combinations of engine rotational speed and vehicle speed may cause excessive engine vibrations.

According to embodiments wherein the control arrangement 38 is arranged in a vehicle 2, the vehicle 2 may comprise a positioning system 78, such as a GPS system. The control arrangement 38 may be configured to determine a position of the vehicle 2. When operating the internal combustion engine 4 below the threshold rotational speed and in response to the position of the vehicle 2 being determined to be within an area of a particularly defined type, the control arrangement 38 may be configured to: change the timing of the exhaust camshaft 10 to advance closing of the exhaust valve 20, and change the timing of the intake camshaft 12 to delay opening of the intake valve 22. In this manner, not only the rotational speed of the engine 4 but also the position of the vehicle may determine whether the timings of the exhaust and intake camshafts 10, 12 are changed. Namely, the area of a particularly defined type may relate to certain geographical areas, wherein excessive vehicle noise may be prohibited. In such areas, the reduction of engine vibrations may be beneficial from a vehicle noise reduction perspective.

Figure 4:
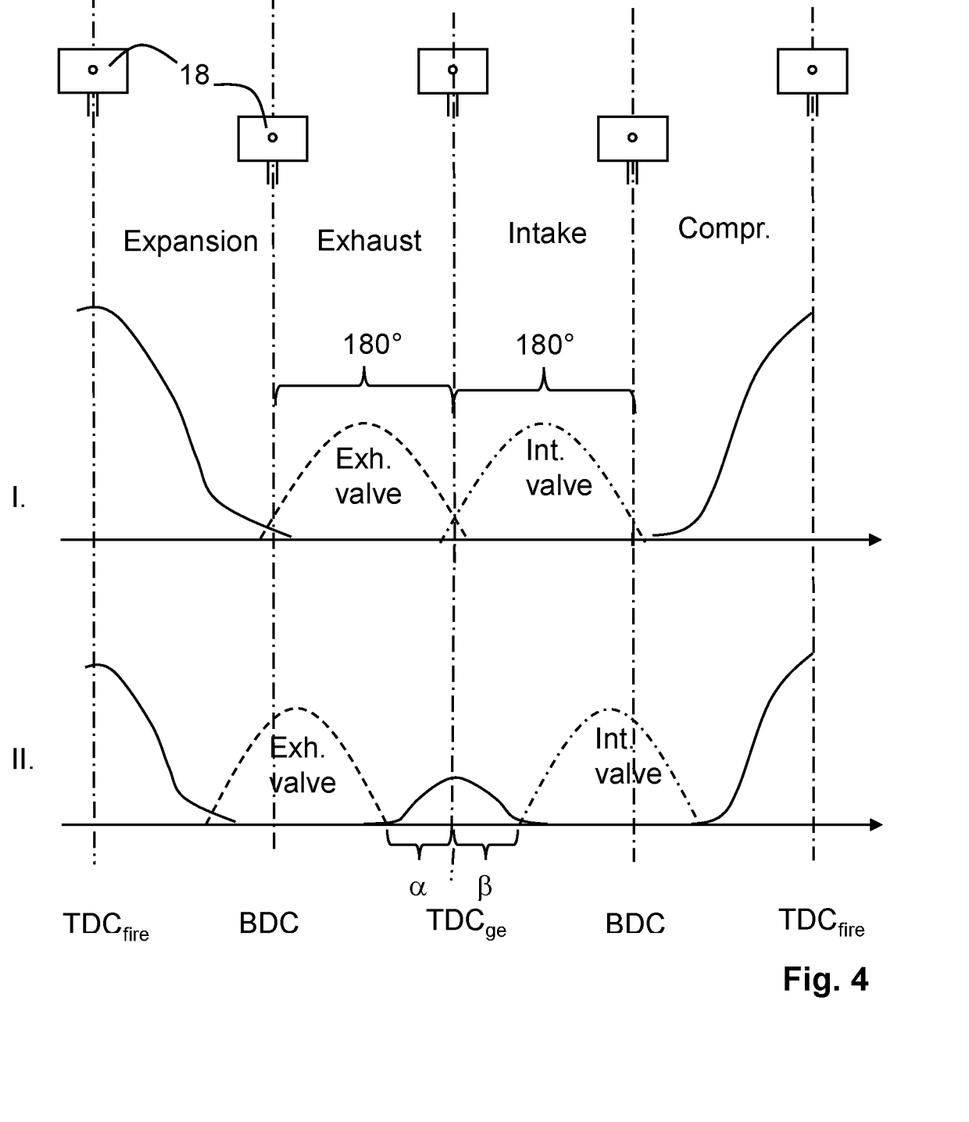
FIG. 4 illustrates diagrams over operation of an ICE.

FIG. 4 illustrates diagrams over the ICE 4 of FIG. 2, and control thereof in accordance with the discussion above with reference to FIGS. 1-3. Accordingly, in the following reference is also made to FIGS. 1-3. FIG. 4 illustrates the four strokes of a piston 18 and the movements of the exhaust valve 20 (broken line) and of the intake valve 22 (dash-dotted line) during operation of the ICE 4. The crankshaft 8 of the ICE 4 rotates 720 degrees CA as the four strokes of the piston 18 are performed. For each stroke, the crankshaft 8 rotates 180 degrees CA as indicated in FIG. 4. The full line indicates the pressure within the combustion chamber 14 of the ICE 4.

Along line I. the opening and closing of the exhaust and intake valves 20, 22 are shown during ordinary combustion in the ICE 4 without variable valve timing applied. The exhaust valve 20 and the intake valve 22 are opened and closed in an ordinary manner during the respective exhaust and intake strokes, before and after TDCge.

Along line II. the opening and closing of the exhaust and intake valves 20, 22 are shown with variable valve timing applied in order to reduce engine vibrations when the engine 4 is operated below a threshold rotational speed. The control arrangement 38 is configured to change the timing of the exhaust camshaft 10 to advance closing of the exhaust valve 20 and to change the timing of the intake camshaft 12 to delay opening of the intake valve 22.

The pressure within the combustion chamber 14 at TDCfire is lower than during ordinary combustion, due to the intake valve 12 closing later and the exhaust valve 10 opening earlier. Also, due to the early closing of the exhaust valve 10 and the late opening of the intake valve 12, a pressure is built up in the combustion chamber 14 at TDCge. According to embodiments of the control arrangement 38 and of the internal combustion engine 4, an absolute value of a timing change angle α of the exhaust camshaft 10 during the change of the timing of the exhaust camshaft 10 and an absolute value of a timing change angle β of the intake camshaft 12 during change of the timing of the intake camshaft 12 may be the same. In this manner, symmetrical timing changes of the exhaust and intake camshafts may be provided. The timing changes may be symmetrical about TDCge.

According to embodiments of the control arrangement 38 and of the internal combustion engine 4, the timing change angle α of the exhaust camshaft 10 to advance closing of the exhaust valve 20 may be at least within a range of −5 to −80 degrees CA or within a range of −10 to −80 degrees CA, and the timing change angle β of the intake camshaft 12 to delay opening of the intake valve 22 may be at least within a range of 5-80 degrees CA or within a range of 10 to 80 degrees CA. In this manner, there may be provided timing change angles α,β, which achieve reduction of engine vibrations.

For instance, timing change angles of up to −60 degrees CA and 60 degrees CA, respectively, may be provided during driving operation of the ICE 4, i.e. when fuel is injected into the combustion chamber 14 and combusted around TDCfire, in order to reduce engine vibrations at low ICE rotational speeds. During motoring of the ICE, i.e. when no fuel is injected into the combustion chamber 14 and the crankshaft 8 of the ICE is driven by a rotation of the wheels of the vehicle, timing change angles of up to −80 degrees CA and 80 degrees CA, respectively, may be provided in order to reduce vibrations at low ICE rotational speeds.

Figure 5:
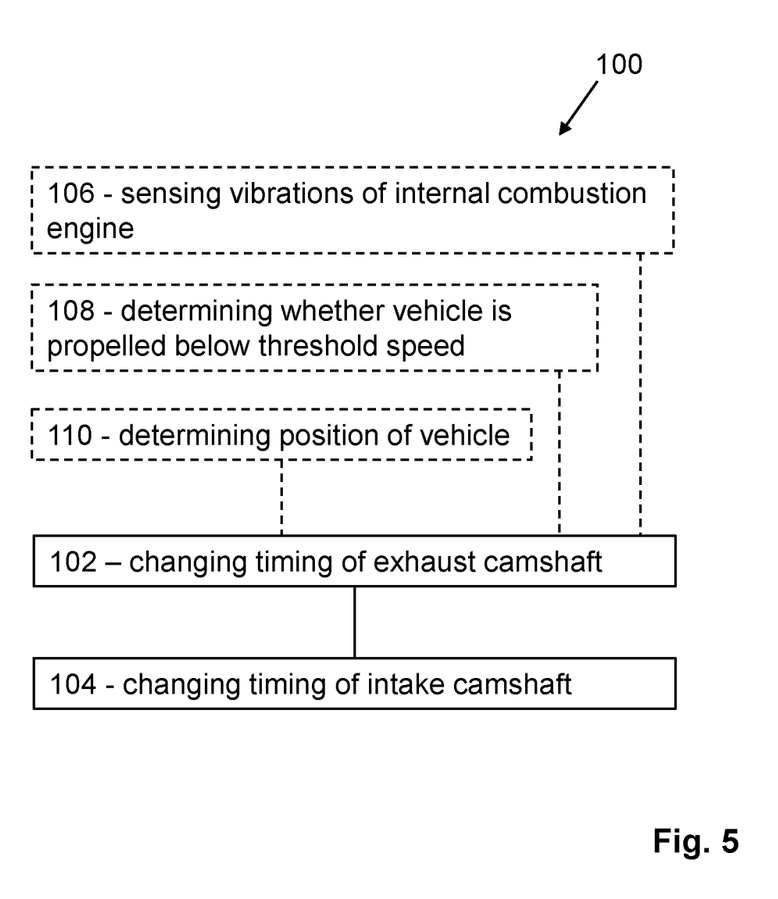
FIG. 5 illustrates embodiments of a method for vibration reduction in a compression ignition four-stroke internal combustion engine.

FIG. 5 illustrates embodiments of a method 100 for vibration reduction in a compression ignition four-stroke internal combustion engine 4, when operating the ICE 4 below a threshold rotational speed, the method 100 comprise steps of:
  changing 102 a timing of the exhaust camshaft 10 to advance closing of the exhaust valve 20, and
  changing 104 a timing of the intake camshaft 12 to delay opening of the intake valve 22.

Embodiments of the control arrangement 38 discussed above are applicable in a corresponding manner in the method 100.

According to embodiments, the threshold rotational speed may be a rotational speed within a range of 1-1000 rpm.

According to embodiments, preceding the steps of changing 102 the timing of the exhaust camshaft 10 and changing 104 the timing of the intake camshaft 12, the method 100 may comprise a step of:
  sensing 106 vibrations of the internal combustion engine, and wherein in response to sensed vibrations exceeding a threshold level the steps of changing 102 the timing of the exhaust camshaft 10 and changing 104 the timing of the intake camshaft 12 may be performed.

According to embodiments, the method 100 may be performed in a vehicle 2 configured for land-based propulsion.

According to embodiments, preceding the steps of changing 102 the timing of the exhaust camshaft 10 and changing 104 the timing of the intake camshaft 12, the method 100 may comprise a step of:
  determining 108 whether the vehicle 2 is propelled at a speed below a threshold speed, and wherein in response to the vehicle 2 being propelled at a speed below the threshold speed the steps of changing 102 the timing of the exhaust camshaft 10 and changing 104 the timing of the intake camshaft 12 are performed.

According to embodiments, the vehicle 2 may comprise a positioning system 78, such as a GPS system, and wherein preceding the steps of changing 102 the timing of the exhaust camshaft 10 and changing 104 the timing of the intake camshaft 12, the method 100 may comprise a step of:
 determining 110 a position of the vehicle 2, and wherein in response to the position of the vehicle 2 being determined to be within an area of a particularly defined type the steps of changing 102 the timing of the exhaust camshaft 10 and changing 112 the timing of the intake camshaft 12 are performed.

According to a further aspect, there is provided a computer program comprising instructions which, when the program is executed by a computer, causes the computer to carry out a method 100 according to any one of aspects and/or embodiments discussed herein.

One skilled in the art will appreciate that the method 100 of controlling timings of an exhaust camshaft 10 and an intake camshaft 12 of a four-stroke ICE 4 may be implemented by programmed instructions. These programmed instructions are typically constituted by a computer program, which, when it is executed in a computer or calculation unit 60, ensures that the computer or calculation unit 60 carries out the desired control, such as the method 100, and thereto related steps 102-110. The computer program is usually part of a computer-readable storage medium which comprises a suitable digital storage medium on which the computer program is stored.

Figure 6:
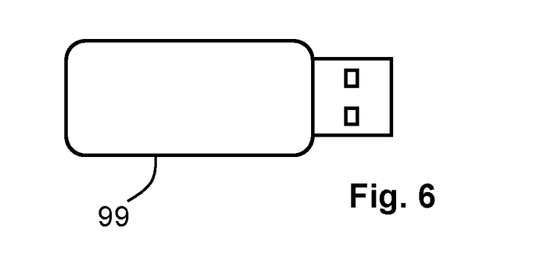
FIG. 6 illustrates embodiments of a computer-readable storage medium.

FIG. 6 illustrates embodiments of a computer-readable storage medium 99 comprising instructions which, when executed by a computer or calculation unit 60, cause the computer or calculation unit 60 to carry out the steps of the method 100 according to any one of aspects and/or embodiments discussed herein.

The computer-readable storage medium 99 may be provided for instance in the form of a data carrier carrying computer program code for performing at least some of the steps 102-110 according to some embodiments when being loaded into the one or more calculation units 60. The data carrier may be, e.g. a ROM (read-only memory), a PROM (programable read-only memory), an EPROM (erasable PROM), a flash memory, an EEPROM (electrically erasable PROM), a hard disc, a CD ROM disc, a memory stick, an optical storage device, a magnetic storage device or any other appropriate medium such as a disk or tape that may hold machine readable data in a non-transitory manner. The computer-readable storage medium may furthermore be provided as computer program code on a server and may be downloaded to the calculation unit 60 remotely, e.g., over an Internet or an intranet connection, or via other wired or wireless communication systems.

The computer-readable storage medium 99 shown in FIG. 6 is a nonlimiting example in the form of a USB memory stick.

It is to be understood that the foregoing is illustrative of various example embodiments and that the invention is defined only by the appended claims. A person skilled in the art will realize that the example embodiments may be modified, and that different features of the example embodiments may be combined to create embodiments other than those described herein, without departing from the scope of the invention, as defined by the appended claims.

The invention claimed is:

1. A method for vibration reduction in a compression ignition four-stroke internal combustion engine of a vehicle, the internal combustion engine comprising:
 an exhaust valve and an intake valve,
 an exhaust camshaft arranged to control opening and closing of the exhaust valve, and
 an intake camshaft arranged to control opening and closing of the intake valve, wherein the method comprises: determining a position of the vehicle; and
 when operating the internal combustion engine below a threshold rotational speed and in response to the position of the vehicle being determined to be within an area of a particularly defined type, steps of:
  changing a timing of the exhaust camshaft to advance closing of the exhaust valve, and
  changing a timing of the intake camshaft to delay opening of the intake valve.

2. The method according to claim 1, wherein a timing change angle ($\alpha$) of the exhaust camshaft to advance closing of the exhaust valve is at least within a range of −0.1 to −80 degrees CA, and a timing change angle ($\beta$) of the intake camshaft to delay opening of the intake valve is at least within a range of 0.1 to 80 degrees CA.

3. The method according to claim 1, wherein the threshold rotational speed is a rotational speed within a range of 1-1000 rpm.

4. The method according to claim 1, wherein the vehicle is configured for land-based propulsion.

5. The method according to claim 1, wherein preceding the steps of changing the timing of the exhaust camshaft and changing the timing of the intake camshaft, the method comprises a step of:
 determining whether the vehicle is propelled at a speed below a threshold speed, and wherein in response to the vehicle being propelled at a speed below the threshold speed the steps of changing the timing of the exhaust camshaft and changing the timing of the intake camshaft are performed.

6. A method for vibration reduction in a compression ignition four-stroke internal combustion engine, the internal combustion engine comprising:
 an exhaust valve and an intake valve,
 an exhaust camshaft arranged to control opening and closing of the exhaust valve, and
 an intake camshaft arranged to control opening and closing of the intake valve, wherein the method comprises, when operating the internal combustion engine below a threshold rotational speed, steps of:
  changing a timing of the exhaust camshaft to advance closing of the exhaust valve, and
  changing a timing of the intake camshaft to delay opening of the intake valve, wherein the method is performed in a vehicle configured for land-based propulsion,
 wherein the vehicle comprises a GPS positioning system, and wherein preceding the steps of changing the timing of the exhaust camshaft and changing the timing of the intake camshaft, the method comprises a step of:
  determining a position of the vehicle, and wherein in response to the position of the vehicle being determined to be within an area of a particularly defined type the steps of changing the timing of the exhaust camshaft and changing the timing of the intake camshaft are performed.

7. A control arrangement for controlling a variable valve timing of a compression ignition four-stroke internal combustion engine of a vehicle, the internal combustion engine comprising:
 a sensor configured to sense vibrations of the internal combustion engine,
 an exhaust valve and an intake valve, an exhaust camshaft arranged to control opening and closing of the exhaust valve, and an intake camshaft arranged to control opening and closing of the intake valve, wherein the control arrangement is configured to, when operating the internal combustion engine below a threshold rotational speed and in response to the vehicle being propelled at a speed below a threshold speed:

change a timing of the exhaust camshaft to advance closing of the exhaust valve, and change a timing of the intake camshaft to delay opening of the intake valve.

8. The control arrangement according to claim 7, wherein the threshold rotational speed is a rotational speed within a range of 1-1000 rpm.

9. The control arrangement according to claim 7, wherein the control arrangement is in the compression ignition four-stroke internal combustion engine.

10. The control arrangement according to claim 7, wherein a timing change angle ($\alpha$) of the exhaust camshaft to advance closing of the exhaust valve is at least within a range of −5 to −80 degrees CA, and a timing change angle ($\beta$) of the intake camshaft to delay opening of the intake valve is at least within a range of 5-80 degrees CA.

11. The control arrangement according to claim 7, wherein the control arrangement is configured to:

when operating the internal combustion engine below the threshold rotational speed and in response to sensed vibrations exceeding a threshold level, the control arrangement is configured to:

change the timing of the exhaust camshaft to advance closing of the exhaust valve, and change the timing of the intake camshaft to delay opening of the intake valve.

12. The control arrangement according to claim 7, wherein the vehicle comprises a positioning system comprising a GPS system, and wherein the control arrangement is configured to:

determine a position of the vehicle, and wherein when operating the internal combustion engine below the threshold rotational speed and in response to the position of the vehicle being determined to be within an area of a particularly defined type, the control arrangement is configured to:

change the timing of the exhaust camshaft to advance closing of the exhaust valve, and change the timing of the intake camshaft to delay opening of the intake valve.

13. The method according to claim 1, wherein preceding the steps of changing the timing of the exhaust camshaft and changing the timing of the intake camshaft, the method comprises a step of:

sensing vibrations of the internal combustion engine, and wherein in response to sensed vibrations exceeding a threshold level the steps of changing the timing of the exhaust camshaft and changing the timing of the intake camshaft are performed.

14. The method according to claim 6, wherein preceding the steps of changing the timing of the exhaust camshaft and changing the timing of the intake camshaft, the method comprises a step of:

sensing vibrations of the internal combustion engine, and wherein in response to sensed vibrations exceeding a threshold level the steps of changing the timing of the exhaust camshaft and changing the timing of the intake camshaft are performed.

15. The method according to claim 6, wherein a timing change angle ($\alpha$) of the exhaust camshaft to advance closing of the exhaust valve is at least within a range of −0.1 to −80 degrees CA, and a timing change angle ($\beta$) of the intake camshaft to delay opening of the intake valve is at least within a range of 0.1 to 80 degrees CA.

16. The method according to claim 6, wherein the threshold rotational speed is a rotational speed within a range of 1-1000 rpm, and wherein the method is performed in a vehicle configured for land-based propulsion.

17. The method of claim 1, wherein the determining the position of the vehicle comprises determining the position of the vehicle using a GPS system.

18. The control arrangement of claim 7, wherein an absolute value of a timing change angle ($\alpha$) of the exhaust camshaft during the change of the timing of the exhaust camshaft and an absolute value of a timing change angle ($\beta$) of the intake camshaft during the change of the timing of the intake camshaft are the same.

* * * * *